March 17, 1959     W. C. McMURRY, SR     2,877,981
SELF PROPELLED VEHICLE WITH VERTICALLY ADJUSTABLE
DECK FOR TRANSPORTING FREIGHT CONTAINERS
Filed July 15, 1955     2 Sheets-Sheet 1
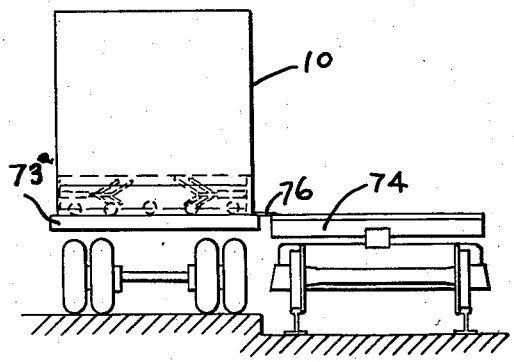
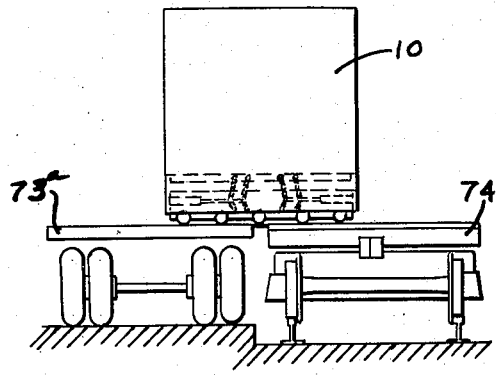
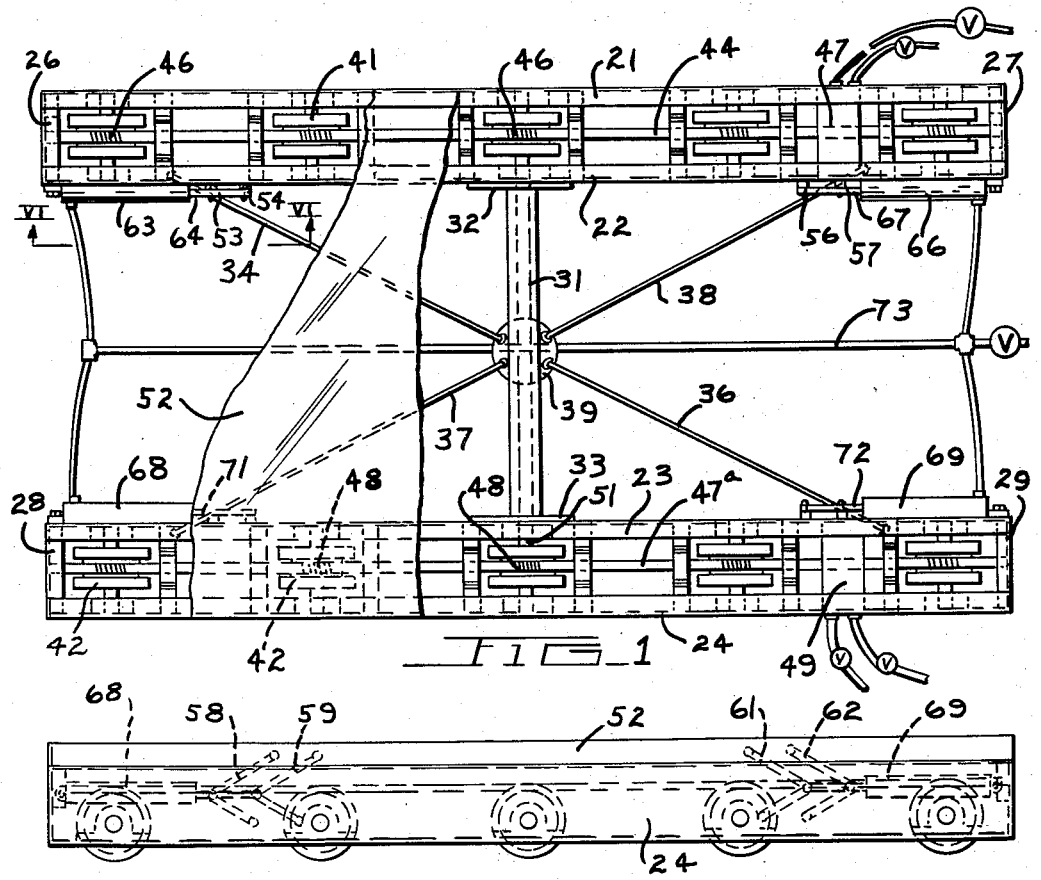
INVENTOR.
WILLIAM C. McMURRY, SR.
BY
Jennings & Carter
ATTORNEYS March 17, 1959  W. C. McMURRY, SR  2,877,981
SELF PROPELLED VEHICLE WITH VERTICALLY ADJUSTABLE
DECK FOR TRANSPORTING FREIGHT CONTAINERS
Filed July 15, 1955  2 Sheets-Sheet 2
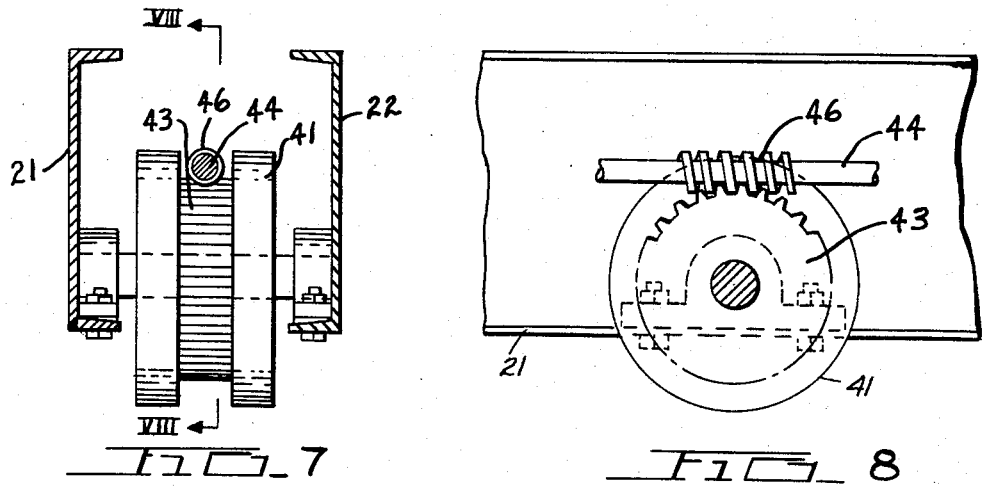
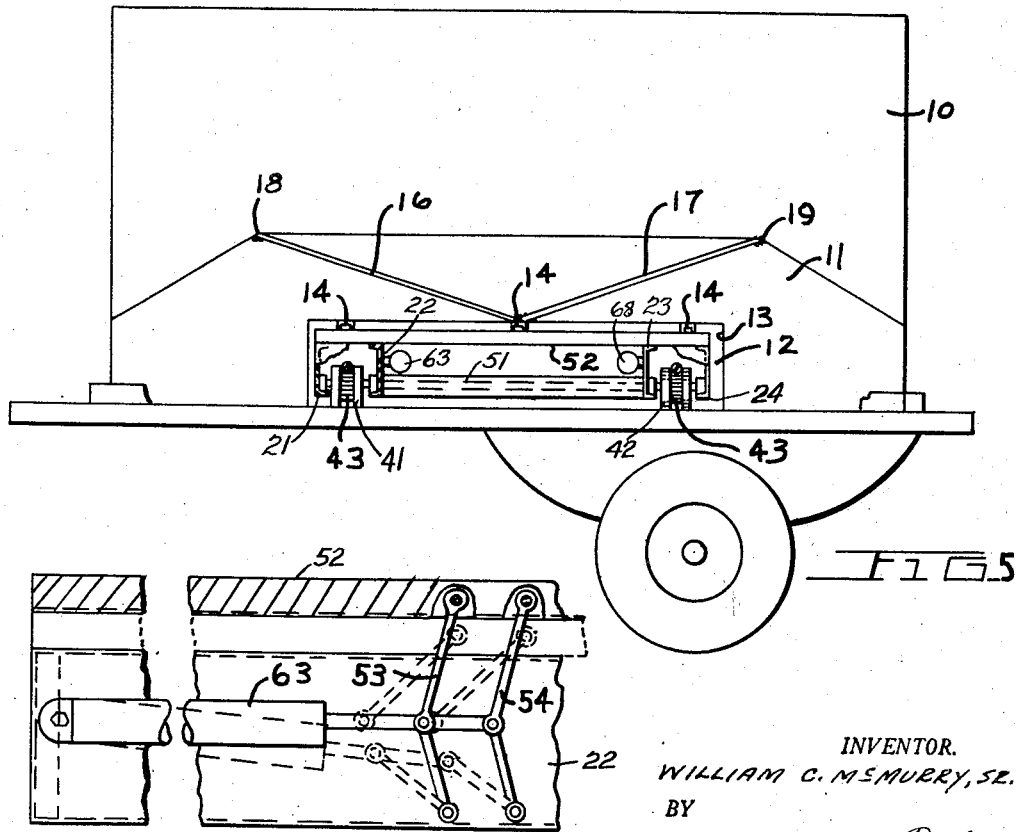
INVENTOR.
WILLIAM C. McMURRY, SR.
BY
Jennings & Carter
ATTORNEYS

United States Patent Office 2,877,981
Patented Mar. 17, 1959

2,877,981

SELF PROPELLED VEHICLE WITH VERTICALLY ADJUSTABLE DECK FOR TRANSPORTING FREIGHT CONTAINERS

William C. McMurry, Sr., Birmingham, Ala., assignor to McMurry Container Corporation, Birmingham, Ala., a corporation of Alabama Application July 15, 1955, Serial No. 522,402

2 Claims. (Cl. 254—9)

This invention relates to transportation equipment employed in highway and in railroad transportation and in particular relates to apparatus for use in transshipping freight containers from one vehicle to another, or from a vehicle to a railroad car.

The principal object of my invention is the provision of a self-propelled apparatus which shall be adapted to lift freight containers such as are employed on highway trailers and railroad cars and to move the containers from one vehicle to another or from a vehicle to a railroad car.

A further feature of my invention is the provision of improved freight containers together with a self-propelled truck adapted to enter a recess under the container and to lift and move the container from place to place.

A still further object of my invention is the provision of a self-propelled truck embodying frame members which shall be movable angularly with respect to each other and each shall embody propulsion means and other means adapted to engage the deck of a vehicle or car, together with means to raise and lower the container off the deck and move it from place to place.

As is well known in the art to which this invention relates, it has been found to be highly economical to combine highway transportation with rail transportation and in order to do so, relatively large freight containers have been devised which are adapted to be transported on a highway trailer or on a railroad car and used thus as the body of the trailer or car, and that in the conduct of such transportation it often becomes necessary to transship the containers from vehicle to vehicle, or from vehicle to freight car. It is accordingly the principal object of my invention to provide a self propelled truck which shall be capable of raising and lowering such containers and moving them from place to place with a minimum expenditure of time and labor, which apparatus shall be simple of design, and economical of manufacture.

Apparatus embodying features of my invention is illustrated in the accompanying drawings, forming a part of this application, in which:

Fig. 1 is a plan view of my improved truck with parts broken away;

Fig. 2 is a side elevation;

Fig. 3 is a diagrammatic end elevation, drawn to smaller scale, showing the apparatus inserted underneath a container mounted on a highway vehicle;

Fig. 4 is a view similar to Fig. 3 showing the container being moved from the highway vehicle onto the railroad car;

Fig. 5 is a side elevation of the container showing my improved truck inserted therebeneath;

Fig. 6 is a detail view showing the means for raising the platform on the truck taken generally along the line VI—VI of Fig. 1;

Fig. 7 is a transverse sectional view of one of the supporting wheels; and,

Fig. 8 is a longitudinal sectional view taken along the line VIII—VIII of Fig. 7.

Referring to the drawings for a better understanding of my invention I show a freight container 10 which may be of the usual size and dimensions and which embodies a reinforcing plate 11 extending from end to end thereof along the sides. On the underside of the container there is provided a recess 12 and the plate 11 and bottom of the container are cut out, or shaped as shown at 13 to outline the recess. Extending transversely of the container in the top of the recess there are preferably provided a plurality of stiffening channels 14. Diagonal braces 16 and 17 are connected at 18 and 19 to the plate and are also connected to the central channel 14. By this means, I provide a container capable of retaining heavy loads in the ends, at the sides of the recess 12, when the container is lifted as hereinafter described.

My improved truck for raising and moving the container comprises frame members embodying two pairs of channels 21, 22, 23 and 24, the channels 21 and 22 facing, and the channels 23 and 24 facing each other. The channels 21 and 22 are joined together at the ends by means of spacer members 26 and 27 and the channel members 23 and 24 are joined together at their ends by spacer members 28 and 29. The pair of channels 21, 22 are joined to the pair 23, 24 by means of a hollow shaft 31 which is journalled in bearings 32 and 33 on the channels 22 and 23, respectively, whereby the pairs of channel members are movable angularly with respect to each other. The pairs of channel members are further connected together by means of flexible braces 34, 36, and 37, 38 which are joined to the frame members near their ends, as shown, and to a plate 39 midway between the frame members. The flexible connectors thus described serve to hold the frame members in substantial parallelism and at the same time permit a limited amount of angular movement relative to each other.

Journalled between the channel members 21 and 22 are a plurality of pairs of supporting wheels 41 and journalled between the channels 23 and 24 are a plurality of similar pairs of supporting wheels 42. Between each pair of supporting wheels there is mounted a gear 43. The gears 43 for the supporting wheels 41 are driven by a worm shaft 44 having a plurality of worms 46, each of which coacts with the gear 43 to drive a pair of the supporting wheels. The worm shaft 44 is driven by means of a reversible hydraulic motor 47 from a suitable source of hydraulic pressure, not shown, but which may be furnished from the highway vehicle or separately, as is well understood in the art. The gears 43 between the supporting wheels 42 are driven from a worm shaft 47a having a plurality of worms 48 thereon each of which coacts with a gear 43 to drive the rollers 42. The worm shaft 47a is driven by a reversible hydraulic motor 49 in a similar manner to the hydraulic motor 47 already described. In order that all the supporting wheels may be driven in unison, I connect one pair of the supporting wheels 41 with the opposite pair of supporting wheels 42 by means of an axle, or a shaft 51 which extend through the hollow shaft 31 connecting the two frame members.

Mounted over the frame just described is a platform 52. The spacing of the frame members and the dimensions of the platform 52 are such that it can pass easily underneath a container 10 into the recess 12. The platform 52 is connected to the channel member 22 by means of double toggle joints 53, 54, located at the left hand end of the frame, as viewed in Fig. 1, and by similar toggle joints 56, 57, located at the right hand of the frame, as viewed in Fig. 1, which toggle joints are oppositely disposed to the joints 53, 54. Similarly, the platform 52 is connected to the channel member 23 by means of oppositely disposed toggle joints 58, 59, and 61, 62. The toggle connections between the platform 52 and the frame members provide sufficient flexibility to permit relative angular movability between the frame members.

At 63 I show a hydraulic cylinder connected by means of its piston rod 64 to the toggle joints 53, 54, and at 66 I show a hydraulic cylinder connected by means of its piston rod 67 to the toggle joints 56, 57. Similarly, on the opposite side of the frame, I show hydraulic cylinders 68 and 69 which are operatively connected through piston rods 71 and 72 to the toggle joints 58, 59 and 61, 62, respectively. Hydraulic fluid under pressure is provided for the operation of all of the hydraulic cylinders, in unison, through a system of flexible conduits 73. It will thus be seen that with the hydraulic cylinders operating in unison and with the toggle joints described being disposed at opposite angles to each other, upon the application of pressure to the hydraulic cylinders the platform 52 will be raised and with it the container 10.

In Figs. 3 and 4 I show a highway vehicle 73a alongside a railroad car 74 with a container 10 ready to be moved from the highway vehicle to the railroad car. A metal, or wooden plate 76 is first placed between the vehicle and the car in order to span the distance therebetween and my improved truck is placed in the recess 12 beneath the container 10, as shown in Fig. 3. The hydraulic motors 47 and 49 which, as will be understood, are reversible, are then operated to rotate the worm shafts 44 and 47a to actuate the supporting wheels 41 and 42 in a direction to move the container from the vehicle to the railroad car. By this means, the container is moved from the highway vehicle 73a to the car 74 as shown in Fig. 4. Inequalities in the floor or the surface of the vehicle or car are compensated by the relative angular movability of the frame members.

From the foregoing it will be apparent that I have devised improved transportation equipment which is simple of design, reliable in operation and which is capable of transshipping freight containers at a minimum expense of time and labor.

While I have shown my invention in but one form, it will be obvious to those skilled in the art that it is not so limited but is susceptible of various changes and modifications without departing from the spirit thereof, and I desire, therefore, that only such limitations shall be placed thereupon as are specifically set forth in the appended claims.

What I claim is:

1. A truck for transshipping freight containers which comprises at least two pairs of parallel beams, the pairs being generally parallel to each other, means secured to said pairs of beams intermediate the ends thereof connecting one of said pairs of beams to the other of said pair of beams for relative limited angular movement in parallel vertical planes, supporting wheels mounted on and between each respective pair of beams, a worm and gear power transmission means corresponding to each of said pairs of beams and each of said worm and gear power transmission means connected to the supporting wheels on the respective pairs of beams, a prime mover for and mounted on each of the pairs of beams, means connecting each prime mover to the corresponding worm and gear power transmission means, means connecting each of said worm and gear power transmission means associated with each pair of beams for driving said transmission means in unison, a platform mounted over said beams and adapted to be inserted beneath and support a container, supporting means connected to said platform and each respective pair of the beams permitting the platform to be raised with respect to the beams, and means connected to the last mentioned supporting means for actuating said last mentioned means to raise and lower the platform relative to the beams.

2. A truck for transshipping freight containers comprising generally parallel spaced apart frame members, a transverse hollow shaft rotatably affixed to said frame members intermediate the ends thereof and connecting one of said frame members to the other of said frame members for relative limited angular movement in parallel vertical planes, a centrally disposed bracket between said frame members, braces flexibly joining the ends of said frame members to said bracket to provide said limited relative angular movement of the frame members in parallel vertical planes, supporting wheels carried by each of said frame members, power transmission means corresponding to each of said frame members and connected to said supporting wheels on the respective frame members, hydraulic power means for and mounted on each of said frame members, means connecting each of said hydraulic power means to the corresponding power transmission means, means connecting each of said power transmission means associated with each of said frames for driving said transmission means in unison, a platform mounted over said frame members and adapted to be inserted beneath and support a container, toggle supporting means connected to said platform and each respective frame member permitting the platform to be raised with respect to the frame members, and means connected to the toggle supporting means for actuating said toggle means to raise and lower the platform relative to the frame members.

References Cited in the file of this patent

UNITED STATES PATENTS

| | | |
|---|---|---|
| 1,350,071 | Davies | Aug. 17, 1920 |
| 1,452,300 | Lightner et al. | Apr. 17, 1923 |
| 1,571,748 | Wilson | Feb. 2, 1926 |
| 1,627,225 | Babel et al. | May 3, 1927 |
| 1,842,074 | Davis | Jan. 19, 1932 |
| 1,942,022 | Faries | Jan. 2, 1934 |
| 2,070,793 | Kent | Feb. 16, 1937 |
| 2,138,485 | Faries | Nov. 29, 1938 |
| 2,380,012 | Ball | July 10, 1945 |
| 2,446,242 | Orshansky | Aug. 3, 1948 |
| 2,478,658 | Harbers | Aug. 9, 1949 |
| 2,626,065 | Sanders et al. | Jan. 20, 1953 |
| 2,714,967 | Olsen | Aug. 9, 1955 |

FOREIGN PATENTS

| | | |
|---|---|---|
| 623,360 | Germany | Dec. 19, 1935 |